United States Patent
Heinig et al.

(10) Patent No.: US 9,739,167 B2
(45) Date of Patent: Aug. 22, 2017

(54) METHOD AND SYSTEM FOR MONITORING ROTATING BLADE HEALTH

(71) Applicants: Roger W. Heinig, Cocoa Beach, FL (US); Jerry H. Griffin, Pittsburgh, PA (US); Drew M. Feiner, Pittsburgh, PA (US)

(72) Inventors: Roger W. Heinig, Cocoa Beach, FL (US); Jerry H. Griffin, Pittsburgh, PA (US); Drew M. Feiner, Pittsburgh, PA (US)

(73) Assignees: SIEMENS ENERGY, INC., Orlando, FL (US); BLADE DIAGNOSTIC CORPORATION, Pittsburgh, PA (US)

( * ) Notice: Subject to any disclaimer, the term of this patent is extended or adjusted under 35 U.S.C. 154(b) by 939 days.

(21) Appl. No.: 13/949,441

(22) Filed: Jul. 24, 2013

(65) Prior Publication Data
US 2014/0030092 A1 Jan. 30, 2014

Related U.S. Application Data

(60) Provisional application No. 61/675,707, filed on Jul. 25, 2012.

(51) Int. Cl.
*F01D 21/00* (2006.01)
*F02C 9/00* (2006.01)
(Continued)

(52) U.S. Cl.
CPC ......... *F01D 21/003* (2013.01); *F01D 21/045* (2013.01); *F01D 25/24* (2013.01);
(Continued)

(58) Field of Classification Search
CPC .......... F01D 21/04; F01D 21/00; F01D 25/24; F02C 9/00; G01H 1/06; G01H 1/00;
(Continued)

(56) References Cited

U.S. PATENT DOCUMENTS 3,721,120 A * 3/1973 Howell .................. F02C 9/00
73/112.03
4,408,294 A 10/1983 Imam
(Continued)

FOREIGN PATENT DOCUMENTS

CN 101762385 A 6/2010
CN 101782475 A 7/2010
(Continued)

OTHER PUBLICATIONS

Griffin, J.H. and Hoosac, T.M., "Model Development and Statistical Investigation of Turbine Blade Mistuning," ASME Journal of Vibration, Acoustics, Stress, and Reliability in Design, vol. 106, Apr. 1984, pp. 204-210.
(Continued)

*Primary Examiner* — Woody Lee, Jr.
*Assistant Examiner* — Joshua R Beebe

(57) ABSTRACT

A method and system for establishing sets of blade frequency values for each rotating blade of a rotor assembly at two or more different points in time and determining an indication of blade health from the change in the blade frequency values is provided. Blade frequency values are determined by receiving measurements of vibratory responses from blade monitoring equipment (20) and processing via a processing device (30) vibration data as a system of rotating blades to extract a frequency of each blade. Sets of blade frequency values are compared to determine a change in the blade frequency values for each rotating blade to provide the indication of blade health.

16 Claims, 7 Drawing Sheets

(51) Int. Cl.
*F01D 21/04* (2006.01)
*F01D 25/24* (2006.01)
*G01H 1/00* (2006.01)
*G01H 1/06* (2006.01)

(52) U.S. Cl.
CPC .............. *F02C 9/00* (2013.01); *G01H 1/006* (2013.01); *G01H 1/06* (2013.01); *F05D 2270/11* (2013.01); *F05D 2270/334* (2013.01); *F05D 2270/708* (2013.01); *F05D 2270/71* (2013.01)

(58) Field of Classification Search
CPC .......... F05D 2270/334; F05D 2270/11; F05D 2270/71; F05D 2270/708
See application file for complete search history.

(56) References Cited

U.S. PATENT DOCUMENTS

| | | | |
|---|---|---|---|
| 4,776,216 A | 10/1988 | Barton et al. | |
| 7,082,371 B2* | 7/2006 | Griffin | G01H 1/006 702/10 |
| 7,206,709 B2* | 4/2007 | Griffin | G01H 1/006 702/85 |
| 7,383,136 B1 | 6/2008 | Griffin et al. | |
| 7,432,505 B2 | 10/2008 | Brummel | |
| 2005/0278127 A1 | 12/2005 | Griffin et al. | |
| 2009/0301055 A1 | 12/2009 | Kallappa | |
| 2011/0132457 A1 | 6/2011 | Finot | |
| 2011/0214878 A1* | 9/2011 | Bailey | E21B 7/00 166/369 |
| 2012/0253697 A1* | 10/2012 | Frankenstein | G05B 23/0254 702/39 |
| 2014/0030092 A1 | 1/2014 | Heinig et al. | |

FOREIGN PATENT DOCUMENTS

| | | |
|---|---|---|
| CN | 102498372 A | 6/2012 |
| DE | 102008057556 A1 | 5/2010 |
| EP | 2299248 A1 | 3/2011 |
| JP | 53229333 A | 9/1988 |
| JP | 3064630 U | 1/2000 |
| JP | 2000506262 A | 5/2000 |
| JP | 2003177059 A | 6/2003 |
| JP | 2012137054 A | 7/2012 |
| WO | 8201416 A1 | 4/1982 |
| WO | 2008093349 A1 | 8/2008 |

OTHER PUBLICATIONS

Yang M.T. and Griffin, J.H., "A Reduced-Order Model of Mistuning Using a Subset of Nominal System Modes," Journal of Engineering for Gas Turbines and Power, vol. 123, Oct. 2001, pp. 893-900.
Feiner D.M. and Griffin J.H., A Fundamental Model of Mistuning for a Single Family of Modes, ASME Journal of Turbomachinery, vol. 124, Oct. 2002, pp. 597-605.
Feiner D.M. and Griffin J.H., "Mistuning Identification of Bladed Disks Using a Fundamental Model of Mistuning—Part I: Theory," ASME Journal of Turbomachinery, 2004, 126(1), pp. 150-158.
Feiner D.M. and Griffin J.H., "Mistuning Identification of Bladed Disks Using a Fundamental Model of Mistuning—Part II: Application," ASME Journal of Turbomachinery, 2004, 126(1), pp. 159-165.
Whitehead, D.S., "The Maximum Factor by Which Forced Vibration of Blades Can Increase Due to Mistuning," Journal of Engineering for Gas Turbines and Power, vol. 120, Jan. 1998, pp. 115-119.
Yang et al, "A Reduced Order Approach for the Vibration of Mistuned Bladed Disk Assemblies," ASME Journal of Engineering for Gas Turbines and Power, vol. 119, 1997, pp. 161-167.
Judge John A. et al, "Mistuning Identification in Bladed Disks," Proceedings of the International Conference on Structural Dynamics Modeling, Madeira Island, Portugal, 2002, pp. 1-10.
Ewins, D.J. et al, "A Method for Modal Identification of Lightly Damped Structures", Journal of Sound and Vibration, vol. 84, No. 1, 1982, pp. 57-79.
Yang et al, "A Reduced-Order Model of Mistuning Using a Subset of Nominal System Modes," Presented at the International Gas Turbine & Aeroengine Congress & Exhibition Jun. 7-10, 1999, (with Discussion accepted at ASME Headquarters until Sep. 30, 1999), pp. 1-11.
Griffin et al:, "Engineering a Breakthrough in Aircraft Safety", Department of Mechanical Engineering at Carnegie Mellon, Carnegie Mech, vol. 8, No. 1, Fall 2004, pp. 3-4.
Tappert Peter et al, "The Last Few Minutes Prior to a Fatigue Blade Failure in an Axial Compressor: Observations of Blade Vibration and Blade Lean," 2007 IEEE Aerospace Conference, Big Sky, MT, Mar. 3-10, 2007, pp. 1-8 (Abstract only).

* cited by examiner

METHOD AND SYSTEM FOR MONITORING ROTATING BLADE HEALTH

This application claims benefit of the 25 Jul. 2012 filing date of U.S. provisional patent application No. 61/675,707, incorporated herein by reference.

FIELD OF THE INVENTION

This invention relates generally to the field of diagnostic testing, and more specifically to the field of blade diagnostic testing for a rotating machine.

BACKGROUND OF THE INVENTION

Mechanical separation of a blade from its rotor while a rotating machine is operating can cause significant damage to the machine and may potentially be hazardous to personnel. Moreover, cracks that may occur in blades can grow to a critical length during operation of the machine and may lead to separation of the blade resulting in damage to the machine.

It is desirable to reduce the likelihood of blade separation. For that purpose, it is a common practice to perform periodic non-destructive examinations of blades in rotating machines. Methods that have been used for such non-destructive examination include visual inspection, magnetic particle inspection, fluorescent penetrant inspection, eddy current inspection, ultrasonic phased-array inspection, and acoustic thermography inspection. Conventional application of these non-destructive examination techniques requires that the turbine rotor be stationary during the inspection.

Even if a crack is not detected during such a periodic stationary non-destructive examination, it is potentially possible for such a crack to initiate and grow to critical size between such examinations. To address this possibility, online systems and methods are known for monitoring the blades while the machine is operating, such as described in U.S. Pat. No. 7,432,505 titled "Infrared-based Method and Apparatus for Online Detection of Cracks in Steam Turbine Components." In this manner, analysis and decision systems may be employed to summarize data and make decisions regarding the operation of a rotating machine such as a turbine.

One potential approach to online monitoring is based on the observation that the presence of a crack in a blade can change the stiffness and therefore the natural frequencies of that blade. Methods are known by which the vibration amplitudes of a blade can be measured as a function of time using, for example, strain gages or tip timing measurements. Such amplitude measurements can be transformed from the time domain into the frequency domain using, for example, FFT techniques. Such techniques have been applied to analyze data for rows of blades, considering each individual blade successively.

Methods have been proposed to use temporal changes in such assessed blade frequencies to detect blade cracks. Such methods have been found not to be robust. For many useful applications, the variations in the frequencies assessed for the same row of uncracked blades at different times and different operating conditions have been found to be of the same order as the changes in frequencies that would result from the presence of a crack of significant size.

The variations in the assessed frequencies arise from the complexity of vibratory behavior that can exist even in a theoretical row of identical blades. For a single blade, each basic mode of vibration, such as for example the fundamental flex bending mode, has a single associated eigenfrequency. But a row of "n" such blades, there are "n" such eigenfrequencies for each basic mode of vibration, each such eigenfrequency being associated with a different nodal diameter.

In real blade rows, the vibratory characteristics of each individual blade are not identical. Understanding the behavior of this type of complex blade system is an active area of research that is referred to in the literature as mistuning.

Accordingly, there is a need in the art for an improved method of blade diagnostic testing for a rotating machine. The present invention is designed to address this need.

BRIEF DESCRIPTION OF THE DRAWINGS

The invention is explained in the following description in view of the drawings that show.

DETAILED DESCRIPTION OF THE INVENTION

Figure 1:
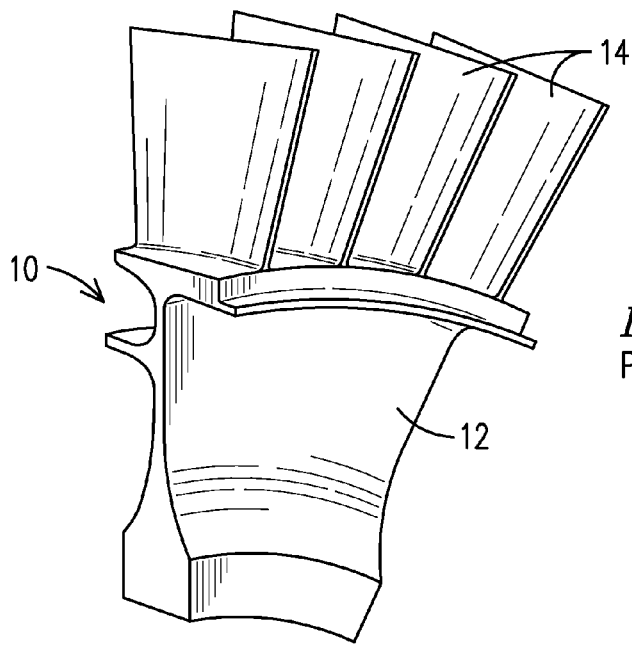
FIG. 1 is a schematic drawing of a section of a rotor assembly.

As shown in FIG. 1, an example of a rotor assembly 10 includes a disk or hub 12 and at least one row of circumferentially spaced rotor blades 14. The blades 14 may be formed integrally with (as illustrated) or separately from the disk 12, and, if separate, may be attached to the disk 12 at a root (not illustrated) of each blade 14. The rotor assemblies referred to herein may include those used in rotating equipment such as aircraft engines, missiles, fans, power generation equipment, pumps, impellors, propellers for naval applications, and wind power generation units. An exemplary gas turbine system may include a compressor, a combustor, and a plurality of turbine blades attached to a rotor.

Figure 2:
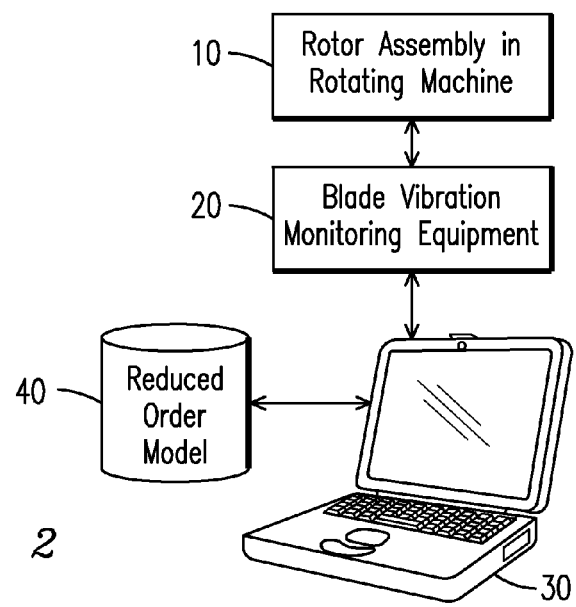
FIG. 2 is a block diagram of an exemplary computer-implemented blade health monitoring system embodying aspects of an embodiment.

Turning to FIG. 2, an exemplary computer implemented system illustrating aspects of an embodiment of the invention includes blade vibration monitoring equipment 20 in order to obtain vibration data of the rotor assembly 10 during the operation of a turbo machine such as a compressor or a gas or steam turbine. Such data may be processed via a processing device 30 such as a computer in accordance with aspects of the invention to monitor the condition (or health) of the blades. Identifying information about the blade frequencies (e.g., one or more properties from the frequency response data) is found via the processing device 30 by fitting a reduced order model 40 to the frequency response data extracted for each blade from the vibratory response data. The data is processed to monitor and report health of the blade, including trending.

Figure 3A:
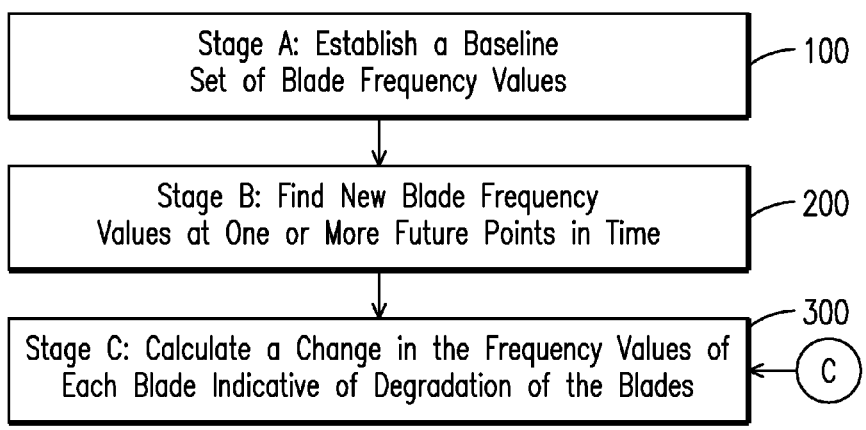
FIGS. 3A-3C are flowcharts showing operation of aspects of an embodiment.
Figure 3B:
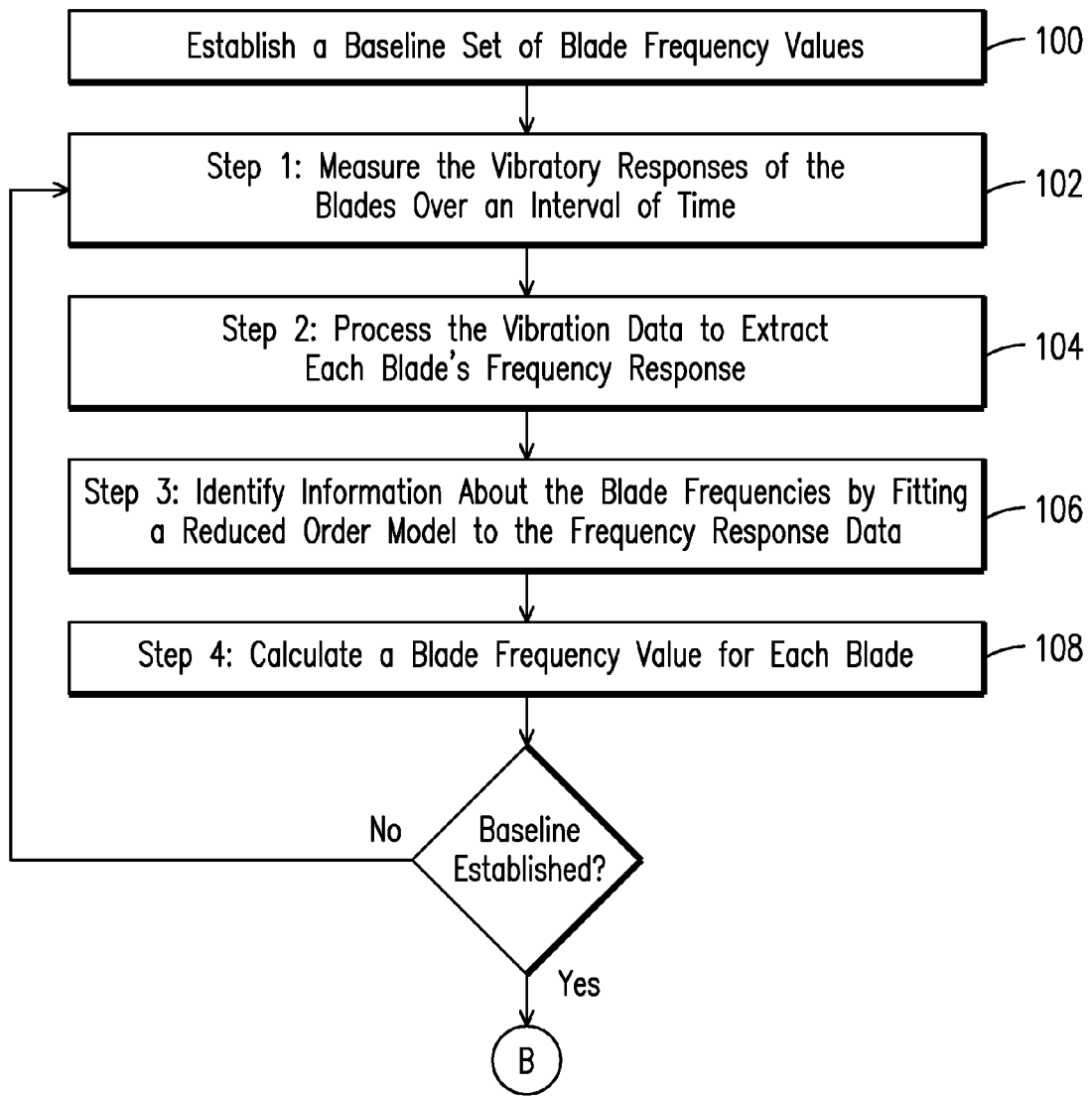
Figure 3C:
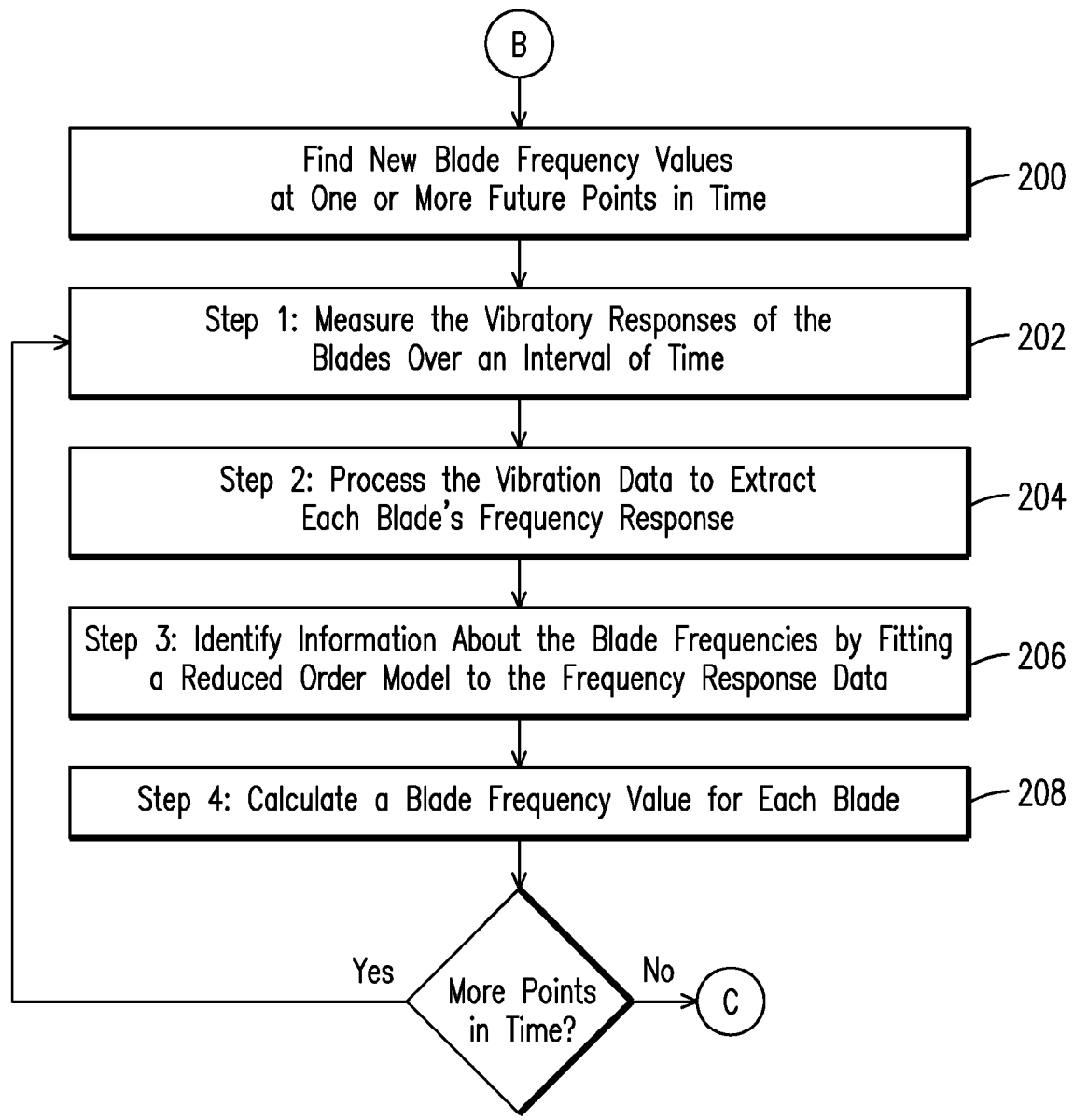

FIGS. 3A-3C depict flowcharts embodying aspects of an embodiment of the invention.

In an embodiment, the method proceeds through three basic stages as illustrated in FIG. 3A. The first stage (Stage A) involves establishing a baseline set of blade frequency values 100. This information is used to define the initial frequency values for the blade set and to assess the level of random noise in the frequency identification process. The next stage (Stage B) comprises finding new blade frequency values at one or more future points in time 200. The final stage (Stage C) involves calculating, typically via a processor, a change in the blade frequency values of each blade wherein it is thereafter determined that changes in the blade frequency values that are larger than a level established for random noise are indicative of changes in the physical state of the blades and are indicative of degradation of the blades 300. This information is then used for diagnostics and health monitoring, including trending.

Turning to FIG. 3B, Stage A of establishing a baseline set of blade frequency values 100 is illustrated in detail comprising Steps 1-4. This stage involves measuring and/or receiving measurements of the vibratory responses of the blades over an interval of time 102, processing the vibration data as a system of rotating blades to extract each blade's frequency response 104, identifying information/parameters about the blade frequencies by, for example, fitting via a processor a reduced order model to the frequency response data 106, calculating a blade frequency value for each blade 108, and repeating the steps until a desired baseline is established.

Turning to FIG. 3C, Stage B of finding new blade frequency values at one or more future points in time 200 is illustrated in detail comprising Steps 1-4. This second stage comprises essentially the same steps as the first stage, namely, measuring and/or receiving measurements of the vibratory responses of the blades over an interval of time 202, processing the vibration data as a system of rotating blades to extract each blade's frequency response 204, identifying information/parameters about the blade frequencies by, for example, fitting via a processor a reduced order model to the frequency response data 206, calculating a blade frequency value for each blade 208, and repeating the steps for a desired number of points in time.

In the present invention, the vibration data is processed as a system of rotating blades, for example wherein the system comprises at least one entire row of rotating blades. In this manner, potential temporal changes in the frequencies of individual blades are assessed by periodically analyzing complete rows of blades using mistuning analysis techniques that treat the blade rows as complex systems, in contrast to the prior art that considers each blade individually in turn. The method taught by the present invention, while computationally complicated and challenging, has been found to be capable of reliably detecting blade cracks that are much smaller than can be detected using the method of prior art. Moreover, the method taught by the present invention has been demonstrated to detect blade cracks that are much smaller than the critical size for mechanical separation of the blade from the rotor.

The blade frequency value is obtained by applying a function wherein the extracted frequency is an independent variable of the function. In one example, the function comprises a blade frequency ratio. This ratio can be, for example, a ratio between the extracted frequency of each rotating blade and an average of the extracted frequencies. Alternatively, this ratio can be a difference of the extracted frequency of each rotating blade and an average of the extracted frequencies over the average of the extracted frequencies. A number of other functions are contemplated herein to provide suitable blade frequency values for use in the method herein. For example, the function can be a difference of the extracted frequency of each rotating blade and an average of the extracted frequencies. In certain instances, the function can comprise a simple algebraic function involving algebraic operations such as addition, subtraction, multiplication, division, and raising to a fractional power, including the simplest case of the identity function. More complex functions are also contemplated herein that comprise mathematical conditions relating the extracted frequency as an input value to a corresponding output value. Different formulas or algorithms may be used to describe the function.

Stage C involves calculating a change in the frequency value of each blade. A change in operating conditions of the machine can cause a change in the frequencies of all of the blades that is proportional to their frequencies at another operating condition. However, blade frequency values can be formulated such that a proportional change in the blades' frequencies will not significantly change their frequency values, especially in the case where the blade frequency value comprises a blade frequency ratio. Consequently, the use of frequency values, such as the blade frequency ratio, provides a more stable assessment of blade degradation that minimizes the effect of changes in the operating conditions. A growing crack will decrease a blade's frequency of vibration over time. Since it is unlikely that all blades will develop similar cracks simultaneously, the frequency value change data can be used as an indication of degradation of the blades 300 and can be used to monitor and report the health of the blades. Trends can also be tracked utilizing this method. An example of change in blade frequency values as a function of time is illustrated graphically in FIG. 11, wherein two blades (identified as Blades 11 and 24) were determined to have cracks by this method and a trend over time can be seen.

Results from this method can be output as a reporting value including an output of a determined change in blade frequency value for any blade which provides an indication of blade health. Moreover, a change in operating parameters of the rotor assembly can be implemented based upon this indication of blade health. A variety of operating parameter changes can include, for example, initiating a shut down, changing a load, changing an exhaust pressure, changing an inlet pressure, changing an inlet temperature, changing an inlet moisture level, changing extraction arrangements, changing extraction conditions, changing the operation of cooling sprays, and changing the operation of moisture removal features.

Some prior art blade monitoring techniques require monitoring vibration as the rotational speed of the machine is ramped through critical frequencies. Such techniques are of limited use when the machine is operated for extended periods at a constant speed, such as is common for baseloaded power plants which may stay online at full power for many months at a time. Embodiments of the present invention are particularly useful during constant speed operation of the machine, where vibration caused by buffeting or random excitation, or caused by self-excited vibration such as flutter is monitored, and the vibration data is processed to extract frequency response information to monitor the condition of the blades.

In another embodiment, a baseline natural frequency for each blade in a row of blades is established for operation of a turbine at a design speed. During a current test period, the natural frequency of each blade in the row is measured at the design speed, and the current natural frequency of each blade is compared to its baseline value to identify any difference. An average of these differences for the entire row of blades is calculated, and the difference for each blade is compared to the average difference. An alarm may be produced if the difference for any individual blade differs from the average difference by a specified amount.

Steps 1-4 (from FIGS. 3B and 3C) are now discussed in more detail below.

Step 1 comprises measuring the vibratory responses of the blades over an interval of time. The vibratory responses of the blades can be measured using a variety of known methods. Two commonly used methods are strain gages and probes that are fixed on the case enclosing the rotating blades. The strain gages are attached to the blades and either a slip ring or telemetry system is used to convey the strain information from the rotating stage to the data recording system. In the case of probes, the probes are used to measure the times when the blades pass the probe. If a blade vibrates, then it will arrive early if it deflects in the direction of rotation and late if it deflects opposite to the direction of rotation. Consequently, the time of arrival information at a predetermined point, or time of flight information for a defined arc length, can be processed to provide a measurement of blade deflection each time a blade passes a probe. Systems for measuring blade vibration are known, such as the optical system shown in U.S. Pat. No. 8,256,297, or commercially available systems such as from Rotadata Ltd. of Derby, United Kingdom; e.g. refer to http://www.rotadata.com/pages/products/blade-tip-timing-stress-measurement.php. Other methods for measuring blade vibration could be used to implement Step 1, including scanning laser vibrometers in which the laser beam follows a particular blade as it rotates, and devices that use RADAR signals to measure the vibratory response of blades.

The second consideration in Step 1 is that the vibration data that are measured during the time interval should contain information that can be used to extract frequency response information for each blade. For example, it could contain information about the frequency responses of the blades in their first bending modes, in their second bending modes, or in some higher order modes.

One type of data that is useful for extracting blade frequency response information is when the time interval for the measurement is chosen to correspond to a resonant crossing at a critical operating speed.

A second type of data that is useful is buffet or random response data. Buffet is a term commonly used to describe the vibratory response of the blades associated with random excitation caused by turbulence in the fluid flow over the blades. Typically, the vibratory motion from random excitation is measured at a constant operating speed that is not near a critical operating speed. Analyzing buffet response data is an especially useful technique for monitoring power generation equipment that operates at a constant speed since no changes in the rotational speed of the unit is needed to establish the frequency responses of the blades and the measurements can be done while the machine continues its normal operation.

A third option is to measure vibration data taken at constant speed while the blades experience an aeroelastic instability such as flutter.

Step 2 comprises processing the vibration data as a system to extract each blade's frequency response. Typically, the vibration information is digitized so that the displacement or strain information is known at discrete time intervals or it can be digitized. As a result, in the cases of flutter or buffet data a Fast Fourier Transform can be used to determine the frequency content of the signal.

Figure 4:
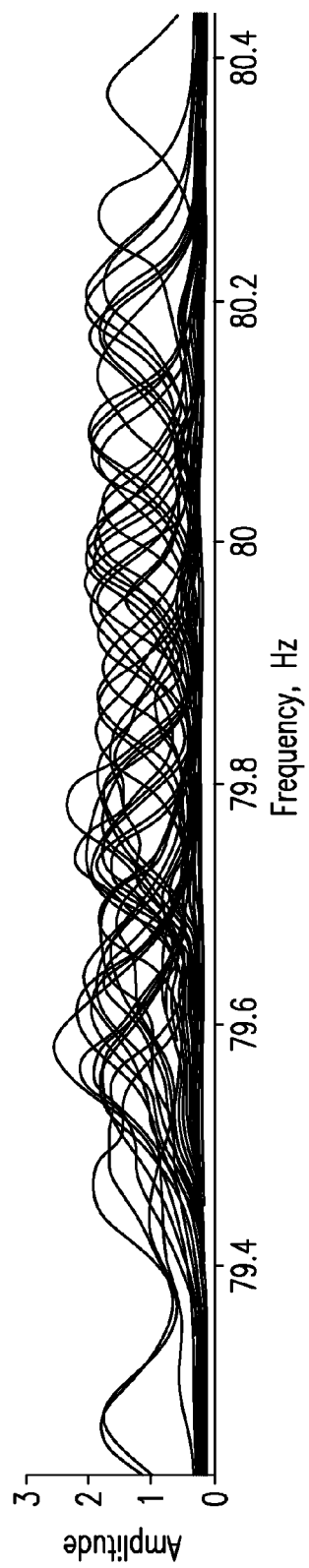
FIG. 4 is a graphical illustration of blade frequency responses extracted from buffet data according to aspects of an embodiment.

As an example, consider the case of determining the frequency responses of blades in their first bending modes. The blades are vibrating in response to a random excitation (e.g., buffet) and the vibration data are measured at a constant speed. The vibration measurements are made using a known probe system. The time of arrival information is processed to determine blade displacements at discrete time samples, i.e. each time the blade passes the probe. The displacement data are processed to extract frequency response information for each blade. This involves using data from subintervals, taking the Fast Fourier Transform of data from the subintervals to get multiple frequency responses, averaging and otherwise smoothing the data. The resulting frequency responses are shown in FIG. 4 where the amplitudes of the individual blades are plotted as a function of the excitation frequency.

In the case of a resonant crossing at a critical operating speed, a different approach may be used. Typically, multiple probes are installed on the case and used to measure the times of arrival of the blades at different circumferential points on the case. Sine-wave fitting algorithms are then used for determining the amplitude, frequency, and phase of each blade at each revolution of the rotor and as a function of rotating speed. This information is essentially the same as frequency response data provided the change in the rotational speed while acquiring the data is sufficiently slow. The data are often further processed to reduce noise. This may involve averaging the data to reduce noise or filtering the data to reduce the blades' frequency responses from a secondary vibration mode that is not of interest. Two companies that commercially provide probe systems and data analysis capability of this type including filtering are Agilis Group, Inc. and Hood Technology Corporation.

Step 3 comprises identifying information about the blade frequencies by fitting a reduced order structural model (ROM) to the frequency response data. In general, the frequency responses of a blade system are complex, i.e., the blades may have more than one resonant peak in a particular mode.

Figure 5:
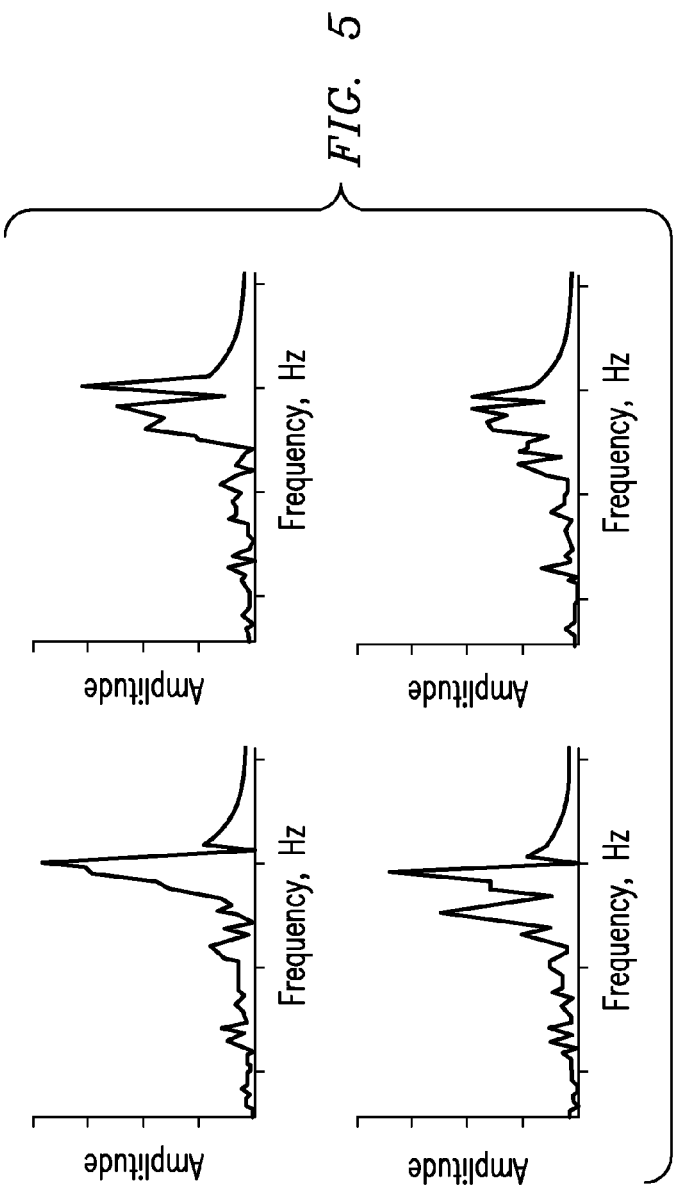
FIG. 5 is a graphical illustration of frequency responses of four sample blades according to aspects of an embodiment.

As an example, consider the frequency responses of four blades shown in FIG. 5. The reason that the frequency responses have multiple peaks is that the blades have slightly different frequencies and that their motions are coupled structurally and aerodynamically. Understanding this type of complex blade system vibration is an active area of research that is referred to in the literature as mistuning [See, for example, Griffin, J. H., and Hoosac, T. M., "Model Development and Statistical Investigation of Turbine Blade Mistuning," ASME Journal of Vibration, Acoustics, Stress, and Reliability in Design, Vol. 106, April 1984, pp. 204-210].

In theory, if every blade were identical then every blade would vibrate identically and there would be only one frequency peak. Because the blades have slightly different frequencies, i.e., they are mistuned, they vibrate in multiple mistuned system modes that have different natural frequencies. The net effect of the blades participating in multiple mistuned system modes is that they exhibit multiple peaks. Consequently, it is difficult to pick out a specific frequency in the resonant response plots and designate it as a blade's natural frequency because the frequency peaks change as the system operating conditions change. In fact, if this approach is tried then the resulting frequencies exhibit so much scatter from one time sample to the next that they could not be used to reliably detect physical changes in the blades caused, for example, by blade cracking, i.e. the uncertainty in the blades' frequencies are greater than the change in frequency that the blade would experience if it contained a crack that was about to cause separation.

Researchers have developed reduced order models (ROMs) for predicting the vibratory responses of mistuned bladed disks [See, for example, Griffin, J. H. and Yang, M. T., "A Reduced-Order Model of Mistuning Using a Subset of Nominal System Modes," Journal of Engineering for Gas Turbines and Power, Vol. 123, October 2001, pp. 893-900; and Griffin, J. H. and Feiner, D. M., "A Fundamental Model of Mistuning for a Single Family of Modes, ASME Journal of Turbomachinery, Vol. 124, October 2002, pp. 597-605]. The reduced order models (ROMs) are useful because they require only a few input parameters to predict the vibratory response of the blade system. One set of input parameters that is used in reduced order models is the frequencies of the individual blades. Because there are relatively few input parameters in these reduced order models, researchers have developed methods for identifying the frequencies of individual blades by identifying the parameters that best fit the frequency responses predicted by the reduced order model to the experimental data [See, for example, Griffin, J. H. and Feiner, D. M., "Mistuning Identification of Bladed Disks Using a Fundamental Model of Mistuning—Part I: Theory," ASME Journal of Turbomachinery, 2004, 126(1), pp. 150-158; and Griffin, J. H. and Feiner, D. M., and "Mistuning Identification of Bladed Disks Using a Fundamental Model of Mistuning—Part II: Application," ASME Journal of Turbomachinery, 2004, 126(1), pp. 159-165]. Consequently, any of these methods that identify individual blade characteristics by fitting a reduced order model to the frequency response data can be used to identify the individual blade characteristic used to monitor the state of the blade and detect blade degradation.

One process for fitting a reduced order model (ROM) to the frequency response data to identify the individual blade characteristic is described in U.S. Pat. No. 7,082,371, "Fundamental mistuning model for determining system properties and predicting vibratory response of bladed disks," and related U.S. Pat. Nos. 7,383,136 and 7,206,709, all of which are incorporated herein by reference. These patents describe a reduced order model referred to as the Fundamental Mistuning Model (FMM) to accurately predict vibratory response of a bladed disk system. The normal modes and natural frequencies of the mistuned bladed disk are directly determined from the disk's vibratory response. These modes and natural frequency may then be input to the FMM ID methodology to monitor the sector frequencies when the bladed disk is actually rotating in the engine.

Figure 6:
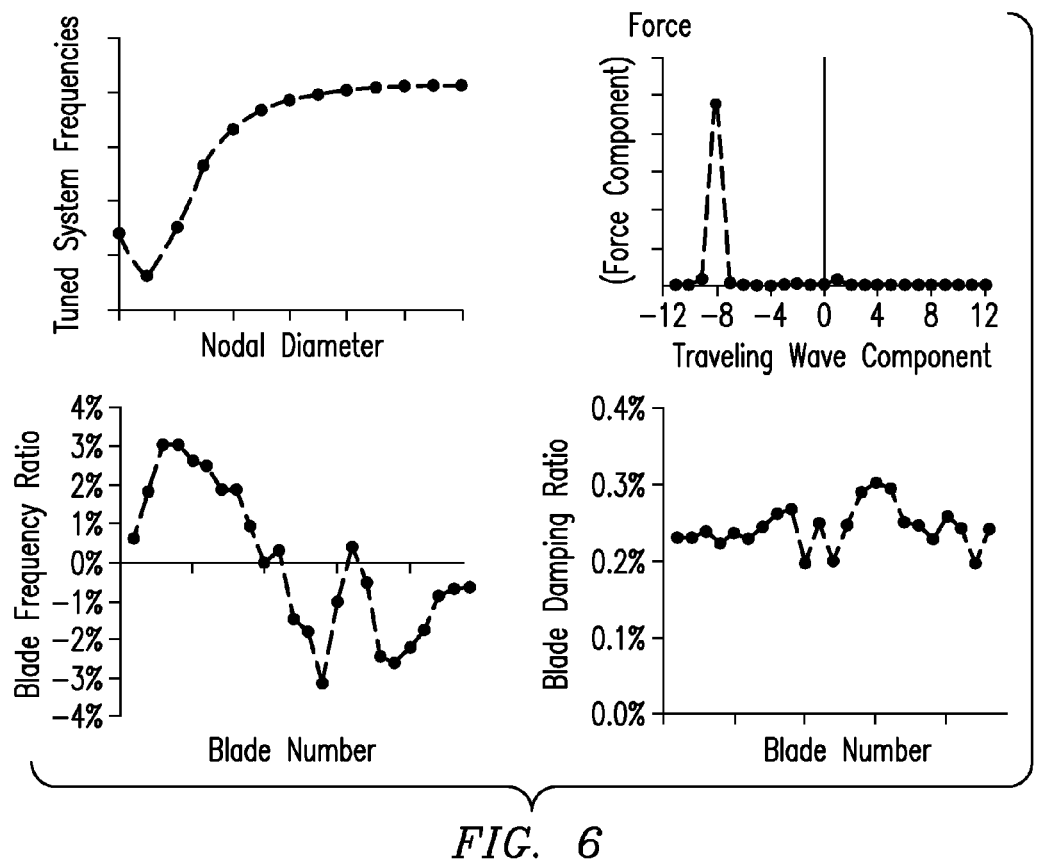
FIG. 6 is a graphical illustration of parameters determined by a best fit of a reduced order model to frequency response data according to aspects of an embodiment.

An example of properties identified from the frequency response data is shown in FIG. 6 (including, nodal diameter plot, force component, blade frequency ratio, and blade damping ratio). In this case, the frequency responses of 24 blades (four of which are shown in FIG. 5) were used as input. The identification step identifies the nodal diameter plot for the bladed disk system, the harmonic content of the forces acting on the blades, the mistuning ratio for each blade sector, and how much damping acts on the blades.

In this example, a key set of parameters comprise the blade frequency values obtained from a function comprising a ratio. Herein, an equation for the blade frequency ratio ($\Delta\omega_k$) for the $k^{th}$ blade is as follows:

$$\Delta\omega_k = (f_k - f_{ave})/f_{ave} \text{ where } k=1,2,\ldots,N \qquad (1)$$

wherein:
N is the number of blades on the rotor in the row(s) of interest,
$f_k$ is the frequency of the $k^{th}$ blade sector and
$f_{ave}$ is the average value of $f_k$.

In the reduced order model of this example, blade frequency ratio $\Delta\omega_k$ is a measure of the frequency variation in a blade sector. A blade sector includes the blade, a portion of the disk that supports the blade, and a portion of any shrouds or snubbers attached to the blade. Consequently, degradation of the blade, the disk, shrouds and snubbers can be detected by frequency changes in the blade sector. Note that while $f_k$ is associated with the $k^{th}$ blade sector, it is assessed in the present invention by an analysis technique that considers the vibratory behavior of the system of all k sectors simultaneously.

There are two important advantages of this approach of using a reduced order model to identify blade frequencies. The first is that the blade frequency ratio $\Delta\omega_k$ is relatively independent of temperature change. The reason is that, to first order, a temperature change causes all of the blades' frequency to change by the same factor. As a result, $f_{ave}$ changes by the same factor and, from equation (1), blade frequency ratio $\Delta\omega_k$ does not change. So, blade frequency ratio $\Delta\omega_k$ can change because of damage to the blade, but not because the temperature of the blades has varied due to changes in operating conditions.

The second important advantage of this approach is that because the method simultaneously identifies the forces acting on the blades and the blade frequency ratios $\Delta\omega_k$, the blade frequency ratios that are identified are, to a great extent, independent of the type of forces exciting the blades. As a result, the look of the frequency response plots can change significantly and the identification process will still determine the same blade frequency ratios.

Figure 7:
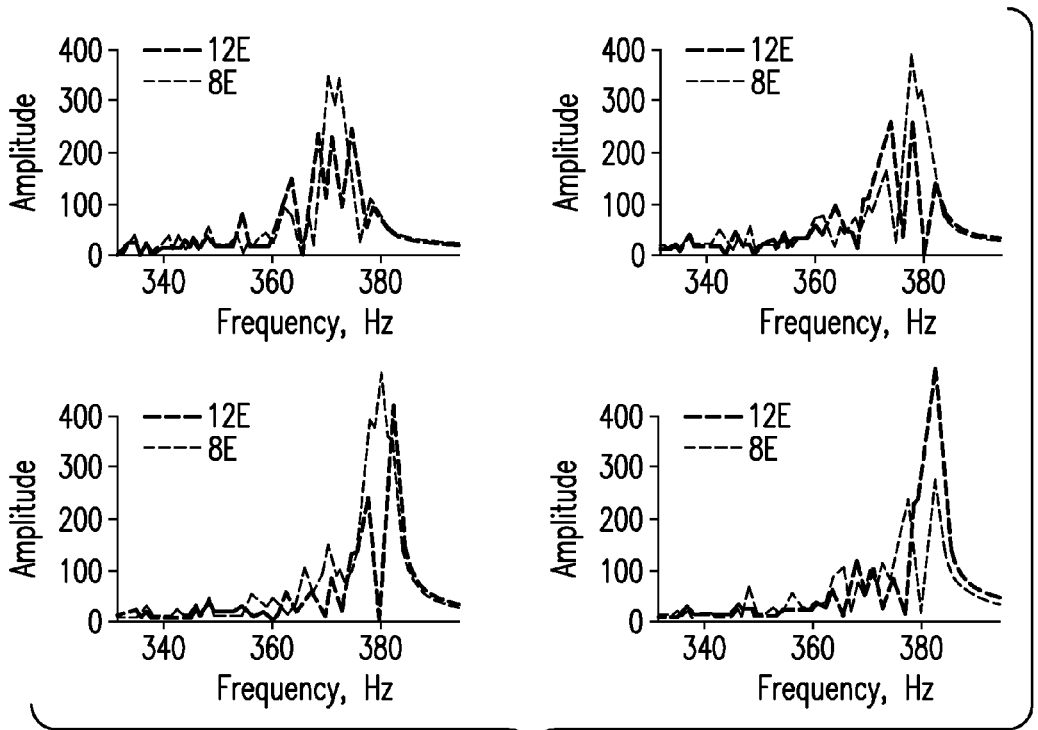
FIG. 7 is a graphical illustration of frequency responses of four representative blades for two different types of excitation according to aspects of an embodiment.
Figure 8:
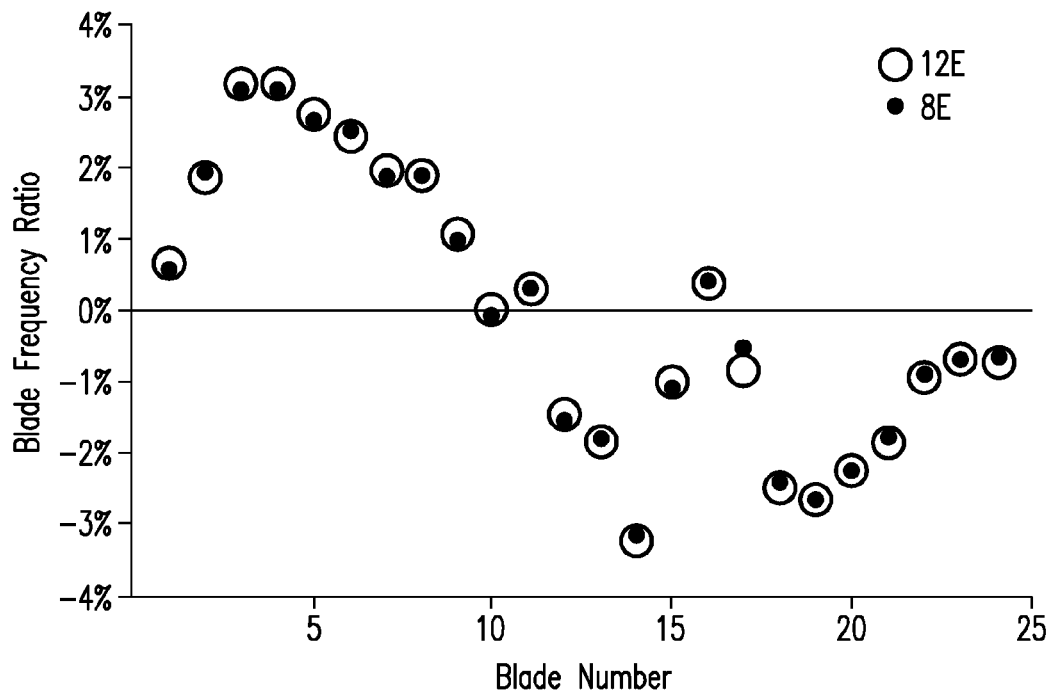
FIG. 8 is a graphical illustration of identified frequency ratios by blade number according to aspects of an embodiment.

For example, the frequency responses of four representative blades are shown in FIG. 7 where one of the curves for each blade shows the measured response to a 12 per revolution type excitation and the other curve shows the measured response to an 8 per revolution type excitation. The frequency responses look very different because the forces are different. The identification step is used to process the two different sets of frequency response data and determine the blade frequency ratios for the blades. The results are shown in FIG. 8. It is clear from FIG. 8 that the identified values of blade frequency ratios $\Delta\omega_k$ are nearly identical for the two cases even though the change in excitation forces significantly changed the shapes of the frequency responses.

An alarm or setpoint value may be selected (and output) based upon a monitored change in blade frequency ratio $\Delta\omega_k$ for any blade. Thus, even though the baseline values of the blade frequency ratios may vary by about 6% from the highest ratio blade to the lowest ratio blade for the blades of FIG. 8, a change over time in the ratio for any given blade of a much smaller value, say a change in a ratio with a magnitude of 1% or less for example, may be selected as an alarm value.

Figure 9:
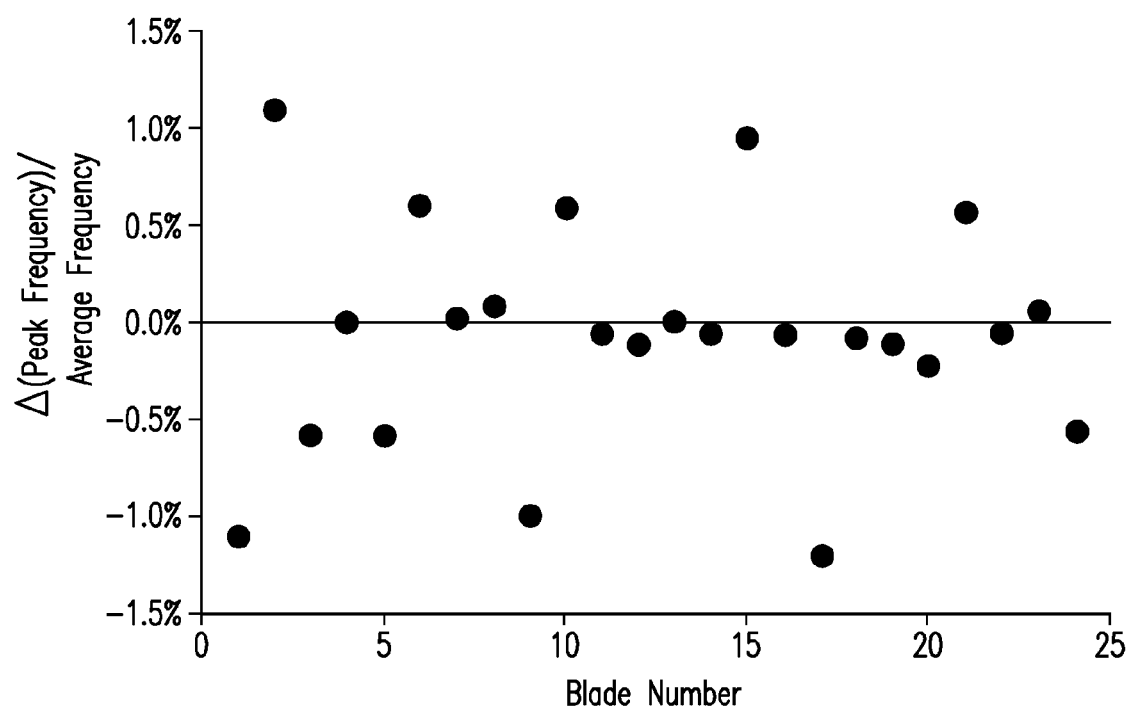
FIG. 9 is a graphical illustration of an apparent change in blade frequencies using peak response method.

An alternative, simple method for trying to characterize blade frequencies is to pick off the frequency that each blade has its maximum value of frequency response (peak response method). This method was used for the case that served as the basis for FIGS. 7-8. It was found that the blade frequency ratios identified using this method changed by more than 1%, FIG. 9, even though, in fact, there was no actual change in the blade frequencies. It is clear that fitting a reduced order model to the frequency response data provides a much more stable method for identifying the frequency characteristics of individual blade sectors than this simple alternative method.

Consider a second example of using a reduced order model approach to identify blade frequency ratios. The identification step is used to identify the blade frequency ratios from the turbine blade frequency response data shown in FIG. 4. The frequency response data corresponds to the blades vibrating in their lowest frequency modes—their first bending modes. Consequently, the frequency response data and identification determine each blade's frequency ratio in first bending as a function of the blade measurement number, i.e. the first blade measured, the second blade measured, etc. Since the vibration data were measured sequentially as the blades passed the probe on the case, the blade measurement number also indicated the circumferential position of the blade on the disk, except that it was not clear which physical location on the rotor corresponded to the first blade that was measured.

Before the blades were installed in the turbine, the blades were constrained at their attachments and their individual frequencies measured. The resulting measured frequencies are referred to as "shop frequencies." The shop frequencies for the lowest frequency mode in each blade were converted to blade frequency ratios using equation (1). A pattern matching algorithm was used to best align the two blade frequency ratio sequences. The results are shown in FIG. 10.

Figure 10:
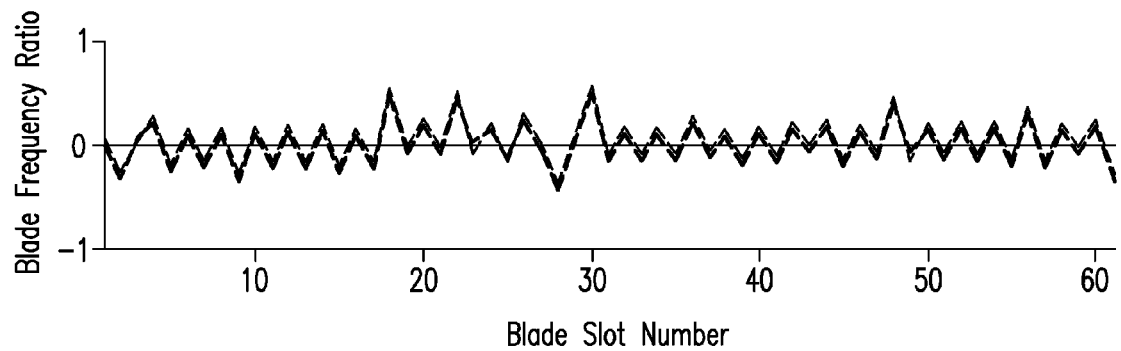
FIG. 10 is a graphical illustration of frequency ratio as a function of aligned blade slot number according to aspects of an embodiment.

There are three curves plotted in FIG. 10 that are hard to distinguish because they look so similar. A first curve was plotted that represents the blade frequency ratios calculated from shop frequencies and scaled so that they have the same standard deviation as the blade frequency ratios calculated from the identification step. It is necessary to scale the frequency ratios measured on the bench because there are other factors such as the rotor's flexibility and centrifugal effects that tend to reduce the blade frequency ratio when the blade is in operation. A second curve was then plotted and corresponds to the blade frequency ratios identified from frequency responses calculated from a "primary" probe, i.e. the probe that is usually used to measure vibratory response for this stage. Lastly, a third curve was plotted that corresponds to the blade frequency ratios identified from frequency responses calculated from a backup probe.

The correlations between the pattern of shop frequency ratios and the patterns of the rotating frequency ratios identified with these blade alignments are excellent, i.e. the correlation coefficient between the shop blade frequency ratios and the rotating blade frequency ratios based on the primary probe is 97.4% and the correlation coefficient with the backup probe is 97.7%. As a result, we know from pattern matching that the blade in the first slot location on the rotor corresponds to the 34$^{th}$ blade measured for the primary probe and the 35$^{th}$ blade measured for the backup probe. Consequently, we can relate a change in a blade's frequency ratio that is extracted from the frequency response data to a specific blade on the rotor. This is very useful information if a damaged blade is detected since the blade's physical location on the rotor is known from the vibration characteristics of the rotor as a whole.

Lastly, the excellent correlation between the shop frequency ratios and the rotating frequency ratios identified has another very important implication. The changes in frequency ratios that are inferred from fitting a reduced order model to the frequency response data directly relate to frequency changes we would see in the blade if it were individually tested in the shop. As a result, it is clear that this approach identifies frequency changes while the stage is rotating that are directly related to the physical state of individual blades.

Step 4 of FIGS. 3B and 3C comprises calculating a blade frequency value for each blade. In this example, the blade's frequency ratio $\Delta\omega_k$ may be defined by equation (1). Step 3 may directly identify a blade's frequency ratio or it may identify the physical frequency of each blade. In the latter case, equation (1) is used to calculate blade frequency ratios from the individual blade frequencies.

The following is an example scenario to illustrate the operation of the invention, wherein the inventive examples shown herein have greatly improved results, and the magnitude of the improvement is clearly unexpected.

An analysis was conducted of a rotor based on vibration data measured. The work resulted in a set of baseline rotating frequency ratios for the blade set (Stage A—establish a baseline set of blade frequency ratios). The power generation unit was shut down for a scheduled inspection and cracked blades were detected. Vibration data had been measured just before the shut-down (Stage B—find new values of blade frequency ratios at one or more future points in time). This data was subsequently analyzed to see if there was a significant change in blade frequency ratios (Stage C—calculate a change in the frequency ratio of each blade indicative of degradation of the blades, i.e., crack).

Using the methods of the invention, the vibration data was analyzed and the change in frequency ratios was calculated from the baseline data to the current data. Based on the analyses, two blades had significant changes in their frequency ratios—the blades that were located in blade slots 11 and 24. It was determined that that these were the blades that had cracks sufficiently large to be detected using this approach. It was then confirmed by physical inspection that blades 11 and 24 were the only blades that had cracks of a significant size (the cracks in a few other blades were about 10 times smaller). Blades 11 and 24 were destructively examined so that the size of the cracks could be measured. Both blades had similar cracks. In fact, it was found that the cracks in blades 11 and 24 are small compared to the size of a crack that would cause a blade to actually separate, thus demonstrating that the inventive method is effective to identify discontinuities in a blade before such discontinuities present a risk of imminent separation.

Figure 11:
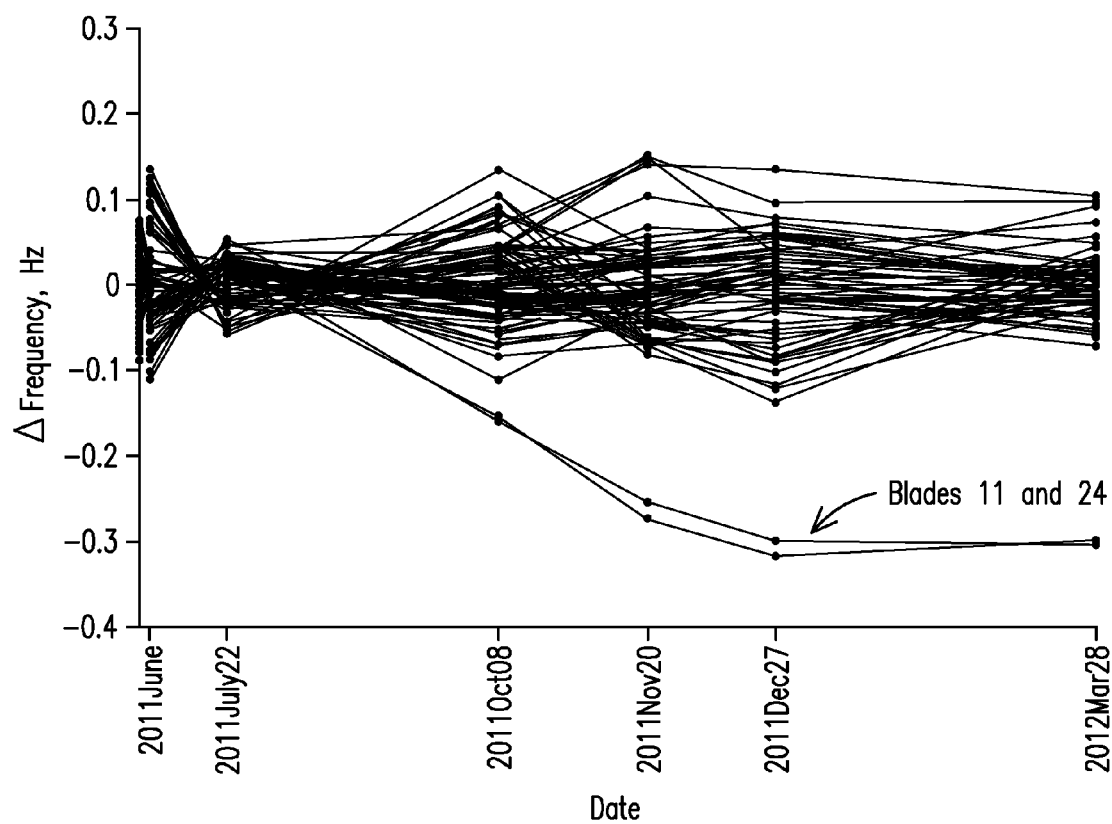
FIG. 11 is a graphical illustration of the change in blade frequencies as a function of time according to aspects of an embodiment.

As a follow-on effort, vibration data from the same machine was used from a series of dates to establish how the frequencies of the blades gradually changed over a time frame. The results of the analyses are shown in FIG. 11. FIG. 11 provides a good illustration of the methodology outlined in Stages A-C.

Stage A—Establish a baseline set of blade frequency ratios: Use steps 1-4 (FIG. 3B) once or multiple times to establish a baseline set of blade frequency ratios. This information is used to define the initial frequency ratios for the blade set and to assess the level of random noise in the frequency identification process. In this example, vibration data were taken from two dates a month apart and used to calculate the frequency ratios of the blades. The three values of frequency ratio were averaged to establish a baseline value of blade frequency ratio for each blade.

Stage B—Find new values of blade frequency ratios at one or more future points in time: Subsequently, use steps 1-4 (FIG. 3C) to determine the frequency ratio for each blade. In this example, the frequency ratios were calculated for a plurality of subsequent dates.

Stage C—calculate a change in the frequency ratio of each blade indicative of degradation of the blades, i.e., crack. A change in the frequency ratio of each blade was calculated by subtracting the new values of blade frequency ratios from the baseline set of blade frequency ratios. The differences in the frequency ratios from the set of baseline values were calculated for each date. The results were multiplied by the nominal blade frequency to convert the changes in frequency ratios to changes in the blades' frequencies. The resulting values were then plotted in FIG. 11. From these results it is determined that changes in the blade frequency ratios that are larger than the level established for random noise are indicative of changes in the physical state of the blades and may be indicative of degradation of the blades (cracks).

It is clear from FIG. 11 that the random noise in the measurement process is about 0.1 Hz. It is also clear that after October 2011 (the first subsequent date), blades 11 and 24 show a clear consistent trend of having significantly lower frequencies. Consequently, the data depicted in FIG. 11 is strongly indicative that blades 11 and 24 have changed their physical state.

In addition to illustrating the steps involved in the process, the information provided in FIG. 11 also indicates a practical approach for its implementation as a health monitoring tool. Because the inspections can be readily done while the unit is in operation, even operation at a constant speed, it can be done at regular intervals. Because the method can detect relatively small cracks, it is feasible to look at data over a number of inspections and confirm that a change in blade frequency is, in fact, a trend and not noise. Thus, the procedure not only provides a sensitive method for detecting blade damage, it also provides an approach that is unlikely to produce false positives, i.e. unlikely to determine that a blade has damage when, in fact, the blade is undamaged.

As can be understood from the foregoing, a system and method of the present invention can be highly beneficial with respect to monitoring blade health and the identification of cracks. The various embodiments of the system and method described herein are useful and cost effective as these embodiments do not require the rotating machine to be taken out of service.

In accordance with one or more embodiments of the present invention, structural arrangements and/or techniques conducive to improvements in blade diagnostic testing and heath monitoring for a rotating machine are described herein. In the detailed description, various specific details are set forth in order to provide a thorough understanding of such embodiments. However, those skilled in the art will understand that embodiments of the present invention may be practiced without these specific details, that the present invention is not limited to the depicted embodiments, and that the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps or in flow charts performed in a manner that is helpful for understanding embodiments of the present invention. However, the order of description should not be construed as to imply that these operations need be performed in the order they are presented, nor that they are even order dependent. Moreover, repeated usage of the phrase "in one embodiment" does not necessarily refer to the same embodiment, although it may. Lastly, the terms "comprising", "including", "having", and the like, as used in the present application, are intended to be synonymous unless otherwise indicated.

Broadly speaking, the invention provides a method, system, apparatus, and non-transitory tangible computer-readable media for blade diagnostic testing and heath monitoring for a rotating machine. Embodiments of the invention provide for determining individual blade rotating natural frequencies from data generated by blade vibration monitoring equipment to allow for processing and detecting degradation of the blade while it is rotating.

The invention can be implemented in numerous ways, including as a system, a device/apparatus, a computer-implemented method, or a non-transitory computer readable medium containing instructions to implement the method. As a system, an embodiment of the invention includes sensors, a memory, input/output devices, a processor unit, communication means, and an optional display device and/or optional database. The methods of the present invention may be implemented as a computer program product with a non-transitory computer-readable medium having code thereon. As an apparatus, the present invention may include electronic devices programmed and/or operating in accordance with the steps of the present invention.

An additional implementation of the invention involves automating all or part of the steps involved in the process. A full automation of the process could involve a computer and/or processing device that: controls the measurement process and frequency with which the measurements are made; automatically calculates the frequency responses of the blades; automatically calculates the changes in the frequency ratios of the blades; and detects significant changes in the blade frequency ratios. It could automatically provide reports describing the state of the blades and/or alert the operator if there appears to be a problem. The computer used for this purpose could be physically located at the site where the blades are monitored or could be in a remote location and the service provided through use of the Internet or other communication means. In the case of aircraft engines the computer could be located in the plane to provide nearly instantaneous feedback to the pilot.

It will be appreciated that data obtained from the method and system described herein may be processed into an appropriate format to demonstrate changes or excursions. Computer code executed by a processor may interpret the reported trends or excursions and notify or alert an operator of the finding. Different types of preprocessing logic may be used to identify excursions or trends. Raw data signals may be processed as collected. Some preprocessing steps may include a continually updated running average with statistical significance for ongoing data collection. This may establish a baseline for comparison of each refreshed data set. Excursions from this baseline may be brought to the attention and disposition of the expert system. Historical averages may be periodically stored for long-term trending and supervisory system disposition. By continually monitoring the operating conditions, the remaining life may be forecasted. The system may provide alarms for critical crack situations. The alarms may notify operators only in the event of imminent damage or separation. The system may also provide alarm signal outputs for connection to standard tripping control devices for the option of automatic tripping.

It will be appreciated that aspects of the invention can also be embodied as computer readable code on a computer readable medium. The computer readable medium is any data storage device that can store data, which thereafter can be read by a computer system. Examples of computer readable medium include read-only memory, random-access memory, CD-ROMs, DVDs, magnetic tape, optical data storage devices. The computer readable medium can also be distributed over network coupled computer systems so that the computer readable code is stored and executed in a distributed fashion.

Based on the foregoing specification, the invention may be implemented using computer programming or engineering techniques including computer software, firmware, hardware or any combination or subset thereof with a processing device. Any such resulting program, having computer-readable code means, may be embodied or provided within one or more computer-readable media, thereby making a computer program product, i.e., an article of manufacture, according to the invention. The computer readable media may be, for example, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

An apparatus for making, using or selling the invention may be one or more processing systems including, but not limited to, a central processing unit (CPU), a processor or processing device, memory, storage devices, communication links and devices, servers, I/O devices, or any subcomponents of one or more processing systems, including software, firmware, hardware or any combination or subset thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system or computer subsystem embodying the method of the invention.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method for managing a health of rotating blades of a rotor assembly, comprising:
  establishing sets of blade frequency values based upon a measured vibratory response of the blades for each rotating blade of a rotor assembly of an engine at two or more different points in time, wherein the blade frequency values are established by analyzing a complete row of blades as a system using a mistuning analysis technique to extract a frequency of each blade which reflects structural and aerodynamic coupling of the blades and applying a function in which the extracted frequency is an independent variable;
  comparing the sets of blade frequency values to determine a change in the blade frequency values for each rotating blade; and
  changing a physical operating parameter of the engine in response to a value of the change in the blade frequency values; and
  wherein the system of rotating blades comprises at least one entire row of rotating blades, and
  wherein the function comprises a blade frequency ratio.

2. The method of claim 1, wherein the blade frequency ratio comprises a ratio between the extracted frequency of each rotating blade and an average of the extracted frequencies.

3. The method of claim 1, wherein the blade frequency ratio comprises a ratio comprising a difference of the extracted frequency of each rotating blade and an average of the extracted frequencies over the average of the extracted frequencies.

4. The method of claim 1, wherein the blade frequency ratios are calculated from the equation $$\Delta\omega_k = (f_k - f_{ave})/f_{ave} \text{ where } k=1,2,\ldots,N$$

wherein:
  $\Delta\omega_k$ is the blade frequency ratio of the kth blade,
  N is the number of blades on the rotor in one or more rows of interest,
  $f_k$ is the frequency of the kth blade, and
  $f_{ave}$ is the average value of $f_k$.

5. The method of claim 1 wherein the function comprises a difference of the extracted frequency of each rotating blade and an average of the extracted frequencies.

6. The method of claim 1, further comprising determining changes in the blade frequency values that are larger than a level of change established for random noise to indicate a change in a physical state of the blades which is indicative of blade health.

7. The method of claim 1, wherein measuring vibratory responses is performed during a substantially constant speed operation of the rotor assembly, while the blades are vibrating in response to buffeting associated with random excitation caused by turbulence in fluid flow over the blades.

8. The method of claim 1, wherein measuring vibratory responses is performed during a substantially constant speed operation of the rotor assembly, while the blades are vibrating in response to flutter associated with an aeroelastic instability.

9. The method of claim 1, wherein the frequency of each blade is extracted using a resonant crossing comprising a condition at which an eigenfrequency of the blade coincides with an integer multiple of the rotational speed of the rotor assembly.

10. The method of claim 1, wherein the physical operating parameter of the engine comprises at least on of the group consisting of initiating a shut down, changing a load, changing an exhaust pressure, changing an inlet pressure, changing an inlet temperature, changing an inlet moisture level, changing extraction arrangements, changing extraction conditions, changing the operation of cooling sprays, and changing the operation of moisture removal features.

11. The method of claim 1, further comprising:
  receiving shop frequencies measured by constraining each blade at its attachment and measuring its individual frequency;
  converting the shop frequencies in each blade to blade shop frequency ratios; and applying a pattern matching algorithm to align the shop frequencies ratios with the second set of blade frequency ratios to determine a blade correspondence for each specific position on the rotor assembly.

12. The method of claim 1 further comprising receiving measurements of vibratory responses of the rotating blades over an interval of time.

13. The method of claim 12, wherein processing vibration data as a system of rotating blades to extract a frequency of each blade comprises identifying one or more properties from the frequency response data of each blade and using the identified properties to extract the frequency of each blade.

14. The method of claim 13, wherein one or more properties are identified from the measurements of vibratory responses comprise one or more of a nodal diameter plot, a harmonic content of forces acting on the blades, a mistuning ratio for each blade sector, and a damping ratio of the blades.

15. The method of claim 1 further comprising using a reduced order model to extract the frequency of each blade.

16. A system for monitoring a health of rotating blades of a rotor assembly, comprising:
a vibration monitor configured to monitor blade vibration;
a processor configured to receive blade vibration data from the vibration monitor, wherein the processor is adapted to:
establish sets of blade frequency values based upon a measured vibratory response of the blades for each rotating blade of a rotor assembly of an engine at two or more different points in time, wherein the blade frequency values are determined by analyzing a complete row of blades using a mistuning technique, and not each blade individually in turn, to extract a frequency of each blade which reflects structural and aerodynamic coupling of the blades and applying a function in which the extracted frequency is an independent variable;
compare the sets of blade frequency values to determine a change in the blade frequency values for each rotating blade;
determine an indication of blade health from the change in the blade frequency values;
changing a physical operating parameter of the engine in response to a value of the change in the blade frequency values.

* * * * *